(12) United States Patent
Li et al.

(10) Patent No.: US 11,508,381 B2
(45) Date of Patent: Nov. 22, 2022

(54) VOICEPRINT RECOGNITION METHOD, MODEL TRAINING METHOD, AND SERVER

(71) Applicant: Tencent Technology (Shenzhen) Company Limited, Shenzhen (CN)

(72) Inventors: Na Li, Shenzhen (CN); Deyi Tuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 17/085,609

(22) Filed: Oct. 30, 2020

(65) Prior Publication Data

US 2021/0050020 A1    Feb. 18, 2021

Related U.S. Application Data

(63) Continuation of application No. PCT/CN2019/093792, filed on Jun. 28, 2019.

(30) Foreign Application Priority Data

Oct. 10, 2018   (CN) .......................... 201811179856.4

(51) Int. Cl.
*G10L 17/04* (2013.01)
*G06F 21/32* (2013.01)
(Continued)

(52) U.S. Cl.
CPC .............. *G10L 17/04* (2013.01); *G06F 21/32* (2013.01); *G06N 3/08* (2013.01); *G10L 17/02* (2013.01); *G10L 17/18* (2013.01)

(58) Field of Classification Search
CPC ......... G10L 17/04; G10L 17/02; G10L 17/18; G10L 25/30; G10L 15/16; G10L 15/063;
(Continued)

(56) References Cited

U.S. PATENT DOCUMENTS

2014/0379354 A1* 12/2014 Zhang .................... G10L 17/24
704/275
2018/0018973 A1    1/2018 Moreno et al.
(Continued)

FOREIGN PATENT DOCUMENTS

CN     102270451 A    12/2011
CN     103971690 A     8/2014
(Continued)

OTHER PUBLICATIONS

Wen et al, A Discriminative Feature Learning Approach for Deep Face Recognition, Computer Vision-ECCV 2016: 14th European Conference, Oct. 14, 2016, pp. 499-504 (Year: 2016).*
(Continued)

*Primary Examiner* — Linda Wong
(74) *Attorney, Agent, or Firm* — Morgan, Lewis & Bockius LLP

(57) ABSTRACT

Embodiments of this application disclose a voiceprint recognition method performed by a computer. After obtaining a to-be-recognized target voice message, the computer obtains target feature information of the target voice message by using a voice recognition model, the voice recognition model being obtained through training according to a first loss function and a second loss function. Next, the computer determines a voiceprint recognition result according to the target feature information and registration feature information, the registration feature information being obtained from a voice message of a to-be-recognized object using the voiceprint recognition model. The normalized exponential function and the centralization function are used for jointly optimizing the voice recognition model, and can reduce an intra-class variation between depth features from the same speaker. The two functions are used for simultaneously supervising and learning the voice recognition
(Continued)

model, and enable the depth feature to have better discrimination, thereby improving recognition performance.

17 Claims, 8 Drawing Sheets

(51) Int. Cl.
*G06N 3/08* (2006.01)
*G10L 17/02* (2013.01)
*G10L 17/18* (2013.01)

(58) Field of Classification Search
CPC ......... G10L 15/02; G10L 25/24; G10L 15/22; G10L 25/78; G10L 17/00; G10L 15/08; G10L 21/02; G10L 21/0208; G06F 21/32; G06F 16/7834; G06F 16/35; G06F 16/3344; G06F 16/3329; G06N 3/08; G06N 3/0454; G06N 3/084; G06N 3/0445; G06N 3/02; G06N 3/088
See application file for complete search history.

(56) References Cited

U.S. PATENT DOCUMENTS

| | | | |
|---|---|---|---|
| 2018/0197547 A1* | 7/2018 | Shi | G10L 25/30 |
| 2021/0125603 A1* | 4/2021 | Liang | G10L 15/16 |

FOREIGN PATENT DOCUMENTS

| | | |
|---|---|---|
| CN | 104157290 A | 11/2014 |
| CN | 104732978 A | 6/2015 |
| CN | 107146624 A | 9/2017 |
| CN | 107680600 A | 2/2018 |
| JP | 2010286702 A | 12/2010 |
| JP | 2019530888 A | 10/2019 |
| WO | WO 2005055200 A1 | 6/2005 |

OTHER PUBLICATIONS

Extended European Search Report, EP19870101.3, dated Oct. 22, 2021, 12 pgs.
Na Li et al., "Deep Discriminative Embeddings for Duration Robust Speaker Verification," Tencent AI Lab, Interspeech 2018, XP055724143, Sep. 6, 2018, 5 pgs.
Tencent Technology, WO, PCT/CN2019/093792, Sep. 11, 2019, 4 pgs.
Tencent Technology, IPRP, PCT/CN2019/093792, Apr. 8, 2021, 5 pgs.
Tencent Technology, ISR, PCT/CN2019/093792, Sep. 11, 2019, 2 pgs.
Wen, Yandong et al. "A Discriminative Feature Learning Approach for Deep Face Recognition," Computer Vision-ECCV 2016: 14th European Conference, Oct. 14, 2016, ISSN: 0302-9743, pp. 499-504.
Shuai Wang et al., "Deep Discriminant Analysis for i-vector Based Robust Speaker Recognition", Key Laboratory of Shanghai Education Comission for Inelligent Interaction and Cognitive Engineering SpeechLab, Department of Computer Science and Engineering, May 3, 2018 7 pgs.

* cited by examiner

VOICEPRINT RECOGNITION METHOD, MODEL TRAINING METHOD, AND SERVER

CROSS REFERENCE TO RELATED APPLICATIONS

This application is a continuation application of PCT Patent Application No. PCT/CN2019/093792, entitled "VOICEPRINT IDENTIFICATION METHOD, MODEL TRAINING METHOD AND SERVER" filed on Jun. 28, 2019, which claims priority to Chinese Patent Application No. 201811179856.4, filed with the State Intellectual Property Office of the People's Republic of China on Oct. 10, 2018, and entitled "VOICEPRINT RECOGNITION METHOD, MODEL TRAINING METHOD, AND SERVER", all of which are incorporated herein by reference in their entirety.

FIELD OF THE TECHNOLOGY

Embodiments of this application relate to the field of artificial intelligence technologies, and in particular, to a voiceprint recognition method, a model training method, and a server.

BACKGROUND OF THE DISCLOSURE

The rapid development of network information technologies enables people to easily obtain various information, but also brings about information security problems. Because an increasing quantity of scenarios involving information security and confidentiality require reliable identity authentication systems, identity authentication technologies based on fingerprints, iris, faces, handwritten signatures, and voice have all been greatly developed under the impetus of application requirements. Voice is an important carrier of identity information. Compared with other biometrics such as faces and fingerprints, voice has low acquisition costs, is easy to use, and is convenient for remote data collection, and a voice-based human-machine communication interface is friendlier. Therefore, the speaker recognition technology has become an important automatic identity authentication technology. In recent years, the speaker recognition technology has an application value that is increasingly important in identity authentication, voice payment, and personalized recommendation in the field of smart homes.

Currently, a system trained based on a convolutional neural network (CNN) can recognize speakers. Such a system usually captures a piece of audio having a fixed duration from short voice, converts the piece of audio into a picture, then inputs the picture into a CNN network for training, and adjusts the entire network through a predefined softmax loss function.

However, a system based on the softmax loss function is likely to have an overfitting phenomenon during a training process, that is, has relatively good performance on a training set is relatively good, but has relatively poor performance on an untrained test set.

SUMMARY

Embodiments of this application provide a voiceprint recognition method, a model training, method and a server. A normalized exponential function and a centralization function are used for jointly optimizing a voiceprint recognition model, and can reduce an intra-class variation between depth features from the same speaker. Two functions are used for simultaneously supervising and learning the voiceprint recognition model, and enable the depth feature to have better discrimination, thereby improving recognition performance.

In view of this, a first aspect of the embodiments of this application provides a voiceprint recognition method, including:

obtaining a to-be-recognized target voice message;

obtaining target feature information of the target voice message by using a voiceprint recognition model, the voiceprint recognition model being obtained through training according to a first loss function and a second loss function, the first loss function being a normalized exponential function, and the second loss function being a centralization function; and determining a voiceprint recognition result according to the target feature information and registration feature information, the registration feature information being obtained from a voice message of the to-be-recognized object using the voiceprint recognition model.

A second aspect of the embodiments of this application provides a model training method, including:

obtaining a to-be-trained voice message set, the to-be-trained voice message set including a voice message corresponding to at least one object;

determining a model adjustment function according to a voice message corresponding to each object in the to-be-trained voice message set, the model adjustment function including a first loss function and a second loss function, the first loss function being a normalized exponential function, and the second loss function being a centralization function; and performing training on the to-be-trained voice message set according to the model adjustment function, to obtain a voiceprint recognition model.

A third aspect of the embodiments of this application provides a computer, including one or more processors and one or more memories storing program modules, the program modules being executed by the processor and including:

an obtaining module, configured to obtain a to-be-recognized target voice message, the obtaining module being further configured to obtain target feature information of the target voice message by using a voiceprint recognition model, the voiceprint recognition model being obtained through training according to a first loss function and a second loss function, the first loss function being a normalized exponential function, and the second loss function being a centralization function; and a determining module, configured to determine a voiceprint recognition result according to the target feature information obtained by the obtaining module and registration feature information, the registration feature information being obtained from a voice message of the to-be-recognized object using the voiceprint recognition model.

A fourth aspect of the embodiments of this application provides a computer, including one or more processors and one or more memories storing program modules, the program modules being executed by the processor and including:

an obtaining module, configured to obtain a to-be-trained voice message set, the to-be-trained voice message set including a voice message corresponding to at least one object;

a determining module, configured to determine a model adjustment function according to a voice message corresponding to each object in the to-be-trained voice message set obtained by the obtaining module, the model adjustment function including a first loss function and a second loss function, the first loss function being a normalized exponential function, and the second loss function being a centralization function; and a training module, configured to perform training on the to-be-trained voice message set according to the model adjustment function determined by the determining module, to obtain a voiceprint recognition model.

A fifth aspect of the embodiments of this application provides a computer, including a memory, a processor, and a bus system connecting the memory to the processor;

the memory being configured to store a plurality of computer programs;

the processor being configured to execute the computer programs in the memory to perform a plurality of operations including:

obtaining a to-be-recognized target voice message;

obtaining target feature information of the target voice message by using a voiceprint recognition model, the voiceprint recognition model being obtained through training according to a first loss function and a second loss function, the first loss function being a normalized exponential function, and the second loss function being a centralization function; and determining a voiceprint recognition result according to the target feature information and registration feature information, the registration feature information being obtained from a voice message of the to-be-recognized object using the voiceprint recognition model.

A sixth aspect of the embodiments of this application provides a computer, including a memory, a processor, and a bus system connecting the memory to the processor;

the memory being configured to store a plurality of computer programs;

the processor being configured to execute the computer programs in the memory to perform a plurality of operations including:

obtaining a to-be-trained voice message set, the to-be-trained voice message set including a voice message corresponding to at least one object;

determining a model adjustment function according to a voice message corresponding to each object in the to-be-trained voice message set, the model adjustment function including a first loss function and a second loss function, the first loss function being a normalized exponential function, and the second loss function being a centralization function; and performing training on the to-be-trained voice message set according to the model adjustment function, to obtain a voiceprint recognition model.

A seventh aspect of the embodiments of this application provides a non-transitory computer-readable storage medium, storing a plurality of computer programs, the plurality of computer programs, when run on a computer, causing the computer to perform the method according to the foregoing aspects.

According to the foregoing technical solutions, the embodiments of this application have the following advantages.

In the embodiments of this application, a voiceprint recognition method is provided. First, a server obtains a to-be-recognized target voice message, and then, the server obtains target feature information of the target voice message by using a voiceprint recognition model, the voiceprint recognition model being obtained through training according to a first loss function and a second loss function, the first loss function being a normalized exponential function, and the second loss function being a centralization function. The server further determines a voiceprint recognition result according to the target feature information and registration feature information, the registration feature information being obtained after the voice message of the to-be-recognized object passes through the voiceprint recognition model. In the foregoing manner, the normalized exponential function and the centralization function are used for jointly optimizing the voiceprint recognition model, the normalized exponential function, as a loss function, can effectively improve discrimination between different speakers in a depth feature space, and the centralization function, as a loss function, can optionally reduce an intra-class variation between the depth features of the same speaker. Two loss functions are used for simultaneously supervising and learning the voiceprint recognition model, and enable the depth feature to have better discrimination, thereby improving recognition performance.

DESCRIPTION OF EMBODIMENTS

Figure 1:
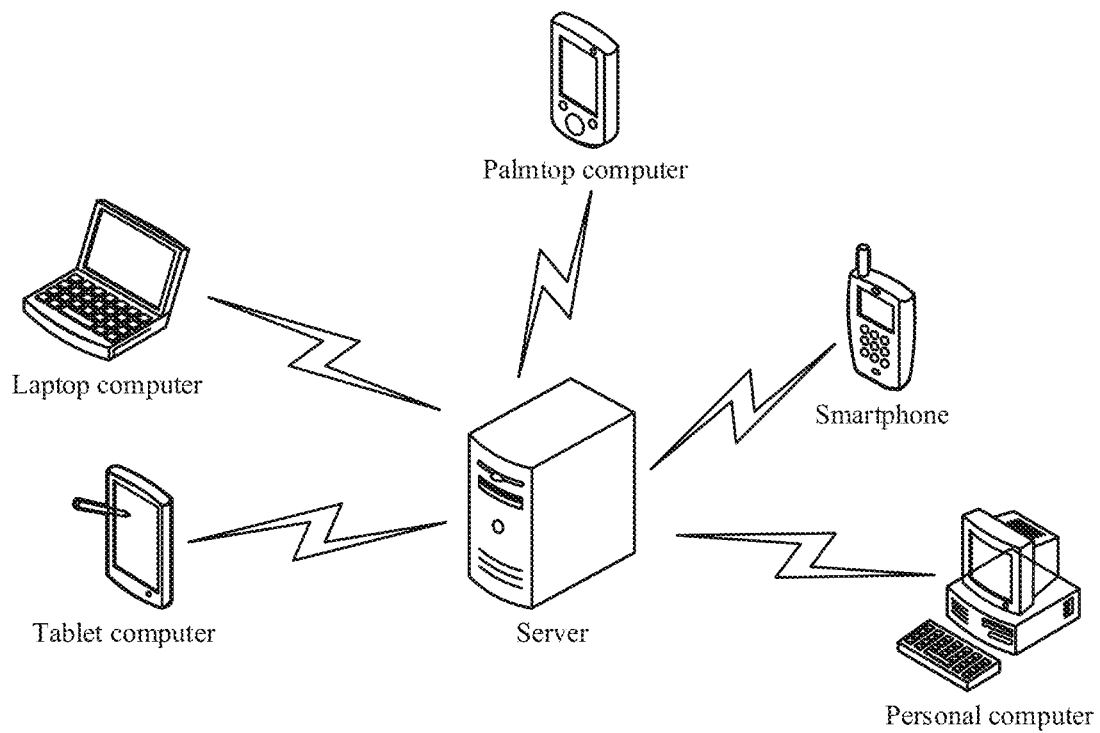
FIG. 1 is a schematic architectural diagram of a voiceprint recognition system according to an embodiment of this application.

Embodiments of this application provide a voiceprint recognition method, a model training, method and a computer. A normalized exponential function and a centralization function are used for jointly optimizing a voiceprint recognition model, and can reduce an intra-class variation between depth features from the same speaker. Two functions are used for simultaneously supervising and learning the voiceprint recognition model, and enable the depth feature to have better discrimination, thereby improving recognition performance.

In the specification of the embodiments of this application, claims, and accompanying drawings, the terms "first", "second", "third", "fourth", and the like (if existing) are intended to distinguish between similar objects, but do not necessarily indicate a specific order or sequence. It is to be understood that data used in this way is interchangeable in a suitable case, so that the embodiments of the embodiments of this application described herein can be implemented in a sequence in addition to the sequence shown or described herein. Moreover, the terms "include", "have", and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, or device.

It is to be understood that the embodiments of this application may be applied to a voiceprint recognition scenario. According to different recognition tasks, speaker recognition may be divided into two types: speaker identification and speaker verification. An objective of speaker identification is to determine a specific speaker, to which a piece of to-be-tested voice belongs, in a known set of registered speakers, and this is a one-to-many recognition problem. However, an objective of speaker verification is to determine whether to-be-tested voice is spoken by a target speaker that has registered, and this is a one-to-one verification problem. The speaker identification is performed within a range of the registered speakers, and is a closed set recognition problem. As a quantity of registered people increases, algorithm complexity increases, and system performance degrades. However, each test of the speaker verification is related to only one target speaker, and this is an open set recognition problem, and system performance is not greatly affected by a quantity of people.

According to requirements for the voice message, the speaker recognition may further be divided into two types: text-dependent and text-independent. The former requires that registered voice and test voice have the same semantic meaning and are applied to a scenario in which a speaker is relatively cooperative. Because the same semantic content may provide more supplementary information for a recognition system, such a system has a better recognition effect and system performance that is insensitive to a change of a voice duration, and may maintain higher accuracy even when a duration is relatively short. However, the latter does not pay attention to semantic content in a voice signal. Compared with the former, the latter has fewer limiting factors, and is applied more flexibly and extensively. However, semantic content is not limited, and there will be voice mismatches in training and testing stages. Such a system has high difficulty in recognition and relatively poor performance, and needs a large quantity of training corpora for obtaining better recognition performance. Performance of a text-independent speaker recognition system rapidly degrades as a duration of test voice becomes shorter, resulting in relatively poor user experience.

To enable the recognition system to be better applicable to voice messages with different lengths, this embodiment of this application provides a speaker recognition method. The method is applied to the recognition system shown in FIG. 1. FIG. 1 is a schematic architectural diagram of a recognition system according to an embodiment of this application. As shown in the figure, a user may initiate a voiceprint recognition request (for example, speak a piece of voice) through a terminal device. After receiving the voiceprint recognition request transmitted by the terminal device, a computer may perform verification on a speaker according to a voiceprint recognition model obtained through training, that is, determine whether the speaker is a speaker that has been registered, thereby generating a voiceprint recognition result. The terminal device includes, but is not limited to, a tablet computer, a notebook computer, a palmtop computer, a smartphone, and a personal computer (PC), and is not limited herein.

That is, the voiceprint recognition system provided in this embodiment of this application may include, but is not limited to, a terminal device and a computer server. The terminal device acquires a to-be-recognized target voice message from a speaker, and then transmits the target voice message to the server. After receiving the target voice message, the server calls the voiceprint recognition model trained in advance to perform feature extraction on the obtained target voice message, to obtain target feature information. A voiceprint recognition result corresponding to the target voice message is then determined according to the target feature information and registration feature information. Therefore, voiceprint recognition is performed on voice of the speaker through an interaction process between the terminal device and the server, to reduce a processing load of the terminal device and improve efficiency and accuracy of voiceprint recognition. In this application, a server, a computer server and a computer are used interchangeably.

In addition, the voiceprint recognition system may alternatively include an independent terminal device or server, the voiceprint recognition process is performed by the terminal device or the server independently, and details are not described again in this embodiment.

Figure 2:
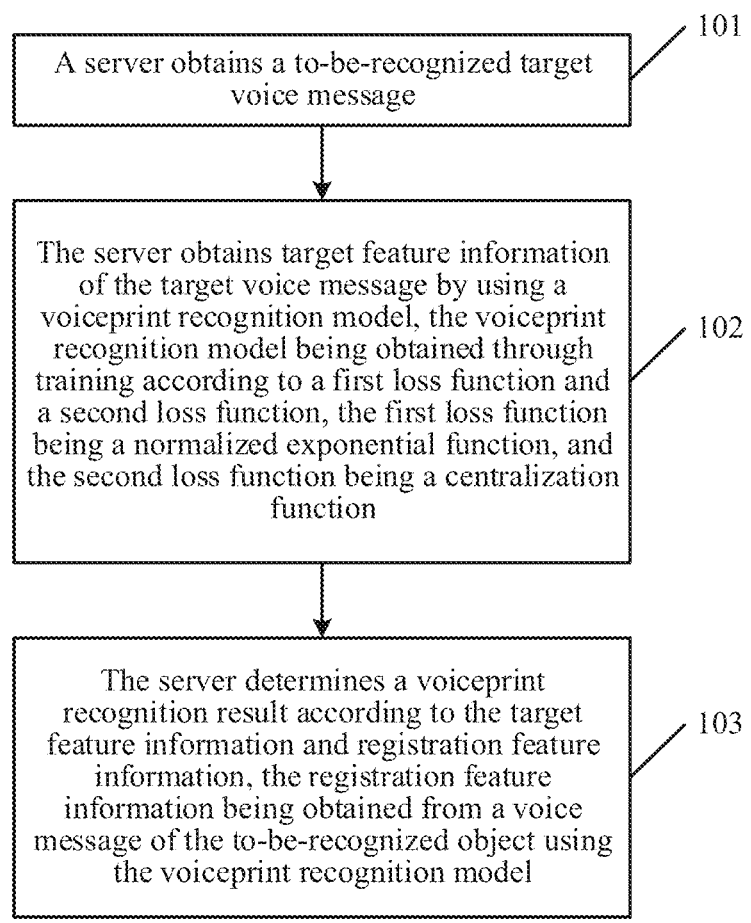
FIG. 2 is a schematic diagram of an embodiment of a voiceprint recognition method according to an embodiment of this application.

The voiceprint recognition method according to an embodiment of this application is described below from a perspective of a server. Referring to FIG. 2, an embodiment of the voiceprint recognition method according to an embodiment of this application includes the following steps.

101. A server obtains a to-be-recognized target voice message.

In this embodiment, a speaker sends a piece of voice through a terminal device. The piece of voice is a to-be-recognized target voice message, and the to-be-recognized target voice message is transmitted to the server by the terminal device.

102. The server obtains target feature information of the target voice message by using a voiceprint recognition model, the voiceprint recognition model being obtained through training according to a first loss function and a second loss function, the first loss function being a normalized exponential function, and the second loss function being a centralization function.

In this embodiment, the server inputs the to-be-recognized target voice message into the voiceprint recognition model, and then the voiceprint recognition model outputs corresponding target feature information, where the voiceprint recognition model is obtained from the first loss function—a normalized exponential function (a softmax loss function) and the second loss function—a centralization function (a center loss function) through joint training.

The softmax loss function measures a difference between a predicted value and a true value.

103. The server determines a voiceprint recognition result according to the target feature information and registration feature information, the registration feature information being obtained after a voice message of the to-be-recognized object passes through the voiceprint recognition model.

Figure 3:
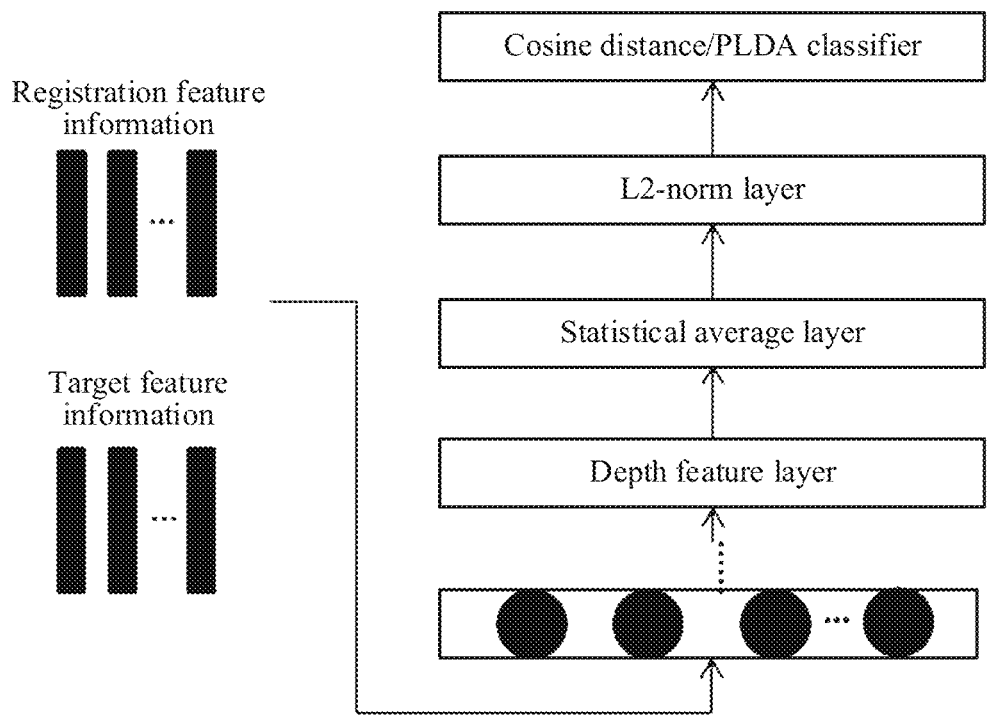
FIG. 3 is a schematic flowchart of determining a voiceprint recognition result according to an embodiment of this application.

In this embodiment, in a process of recognizing the speaker, the server not only needs to extract a feature of the to-be-recognized voice message, but also needs to calculate a test score, and finally determines the voiceprint recognition result according to the test score. For ease of description, FIG. 3 is a schematic flowchart of determining a voiceprint recognition result according to an embodiment of this application. As shown in the figure, the voiceprint recognition model may be a trained CNN. First, registered voice and test voice are divided into smaller sequences of voice segments, if a piece of voice is too short, a voice segment with a suitable duration is generated in a splicing manner, and the voice segment is inputted into the voiceprint recognition model. Registration feature information corresponding to the registered voice is then obtained through a statistical average layer, and the target feature information corresponding to the test voice is obtained through the statistical average layer. The registration feature information and the target feature information herein both belong to a depth feature of a sentence level. Next, an L2-Norm layer optionally normalizes the registration feature information and the target feature information, where the L2-Norm layer refers to a sum of Euclidean distances. Finally, a test score is calculated by using a cosine distance or a probabilistic linear discriminant analysis (PLDA) classifier.

In the embodiments of this application, a voiceprint recognition method is provided. First, a server obtains a to-be-recognized target voice message, and then, the server obtains target feature information of the target voice message by using a voiceprint recognition model, the voiceprint recognition model being obtained through training according to a first loss function and a second loss function, the first loss function being a normalized exponential function, and the second loss function being a centralization function. The server further determines a voiceprint recognition result according to the target feature information and registration feature information, the registration feature information being obtained after the voice message of the to-be-recognized object passes through the voiceprint recognition model. In the foregoing manner, the normalized exponential function and the centralization function are used for jointly optimizing the voiceprint recognition model, the normalized exponential function, as a loss function, can effectively improve discrimination between different speakers in a depth feature space, and the centralization function, as a loss function, can optionally reduce an intra-class variation between the depth features of the same speaker. Two loss functions are used for simultaneously supervising and learning the voiceprint recognition model, and enable the depth feature to have better discrimination, thereby improving recognition performance.

Optionally, based on the embodiment corresponding to FIG. 2, in a first optional embodiment of a model training method according to an embodiment of this application, the determining a voiceprint recognition result according to the target feature information and registration feature information may include:

calculating, by a server, a cosine similarity according to the target feature information and the registration feature information;

determining, by the server, that the target voice message is a voice message of the to-be-recognized object in a case that the cosine similarity reaches a first similarity threshold; and determining, by the server, that the target voice message is not a voice message of the to-be-recognized object in a case that the cosine similarity does not reach the first similarity threshold.

In this embodiment, a method for determining whether a speaker is a speaker that has been registered is provided. Optionally, an implementing process of performing scoring by using a cosine similarity is that if the obtained registration feature information is obtained from training data, feature information belonging to the same object is classified into one class, and a mean of this class is calculated. The mean is the registration feature information. For the target feature information that needs to be scored, a cosine similarity between two pieces of feature information may be calculated, and a recognition result is determined according to the cosine similarity.

Figure 4:
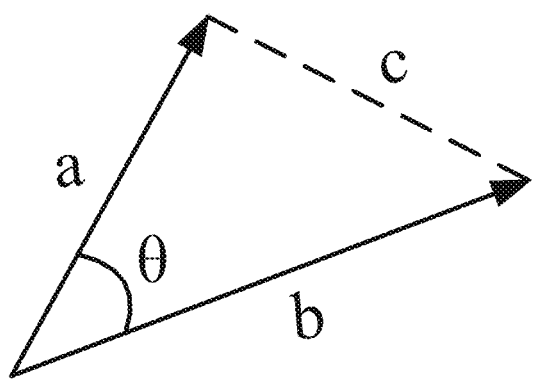
FIG. 4 is a schematic diagram of determining a voiceprint recognition result based on a cosine similarity according to an embodiment of this application.

For ease of description, FIG. 4 is a schematic diagram of determining a voiceprint recognition result based on a cosine similarity according to an embodiment of this application. As shown in the figure, an angle $\theta$ between a vector a and a vector b is calculated first, and a cosine value $\cos \theta$ corresponding to the angle $\theta$ is obtained, where the cosine value may be used for representing a similarity between the two vectors. A smaller angle indicates that the cosine value is closer to 1, and if directions of the two vectors are more consistent, the two vectors are more similar. With regard to the cosine similarity, a cosine value of the angle between the two vectors in a vector space is used as a measure of a difference between two individuals. Compared with a distance measure, the cosine similarity emphasizes a difference between two vectors in terms of direction rather than distance or length.

If the cosine similarity (for example, 0.9) reaches a first similarity threshold (for example, 0.8), the server determines that the target voice message is a voice message of the to-be-recognized object. If the cosine similarity (for example, 0.7) does not reach the first similarity threshold (for example, 0.8), the server determines that the target voice message is not a voice message of the to-be-recognized object.

In an actual application, in addition to the above-described determining the voiceprint recognition result based on the cosine similarity, similarity detection may alternatively be performed by using a Euclidean distance, a Minkowski distance, a Manhattan distance, a Chebyshev distance, a Mahalanobis distance, a Pearson correlation coefficient, or a Jaccard similarity coefficient.

Second, in this embodiment of this application, in a process that the server determines the voiceprint recognition result according to the target feature information and the registration feature information, the cosine similarity may be calculated first according to the target feature information and the registration feature information. If the cosine similarity reaches the first similarity threshold, the server determines that the target voice message is a voice message of the to-be-recognized object. If the cosine similarity does not reach the first similarity threshold, the server determines that the target voice message is not a voice message of the to-be-recognized object. In the foregoing manner, the cosine similarity is to distinguish a difference in terms of direction, and is mainly used for distinguishing a similarity and a difference between users by using scores of the users on the content, and in addition, a problem of inconsistent metrics that possibly exists between the users is fixed, thereby being conductive to improving reliability of the voiceprint recognition result.

Optionally, based on the embodiment corresponding to FIG. 2, in a second optional embodiment of a model training method according to an embodiment of this application, the determining a voiceprint recognition result according to the target feature information and registration feature information may include:

calculating, by a server, a log-likelihood ratio between the target feature information and the registration feature information by using a PLDA classifier;

determining, by the server, that the target voice message is a voice message of the to-be-recognized object in a case that the log-likelihood ratio reaches a second similarity threshold; and determining, by the server, the target voice message is not a voice message of the to-be-recognized object in a case that the log-likelihood ratio does not reach the second similarity threshold.

In this embodiment, another method for determining whether a speaker is a speaker that has been registered is provided. Specifically, an implementation process of performing scoring by using a PLDA classifier is as follows:

In the field of voiceprint recognition, it is assumed that voice, as training data, includes voice of I speakers, each speaker having J different pieces of his or her own voice. In this case, the $j^{th}$ piece of voice of the $i^{th}$ speaker is defined as $X_{ij}$, and then, according to factor analysis, a generation model of $X_{ij}$ is defined as:

$$x_{ij}=u+Fh_i+Gw_{ij}+\varepsilon_{ij}$$

The model may be regarded as two parts. The first two items on a right side of the equal sign are only related to the speaker and not related to a specific piece of voice of the speaker, and are referred to as a signal part, describing an inter-class difference between speakers. The last two items on the right side of the equal sign describe a difference between different pieces of voice of the same speaker, and are referred to as a noise part. In this case, two imaginary variables are used for describing a data structure of a piece of voice. Two matrices F and G include basic factors in respective imaginary variable spaces, and the basic factors may be regarded as eigenvectors of the respective spaces. For example, each column of F is equivalent to an eigenvector of an inter-class space, and each column of G is equivalent to an eigenvector of an intra-class space. Moreover, the two vectors may be regarded as feature representations in the respective spaces. For example, $h_i$ may be regarded as the feature representation of $X_{ij}$ in a speaker space. In a recognition and scoring stage, if a likelihood that $h_i$ features of two pieces of voice are the same is greater, it is more likely to determine that the two pieces of voice belong to the same speaker.

There are four PLDA model parameters in total, respectively, a data mean u, spatial feature matrices F and G, and a noise covariance $\varepsilon$. A classic maximum expectation algorithm is used in a training process of a model to perform calculation iteratively.

Second, in this embodiment of this application, in a process in which the server determines the voiceprint recognition result according to the target feature information and the registration feature information, the log-likelihood ratio between the target feature information and the registration feature information may be calculated by using the PLDA classifier first. If the log-likelihood ratio reaches the second similarity threshold, the server determines that the target voice message is a voice message of the to-be-recognized object. If the log-likelihood ratio does not reach a second similarity threshold, the server determines that the target voice message is not a voice message of the to-be-recognized object. In the foregoing method, the PLDA is used as a channel compensation algorithm, a channel compensation capability thereof is better than a conventional linear discriminant analysis classifier, thereby being conductive to improving reliability of the voiceprint recognition result.

Figure 5:
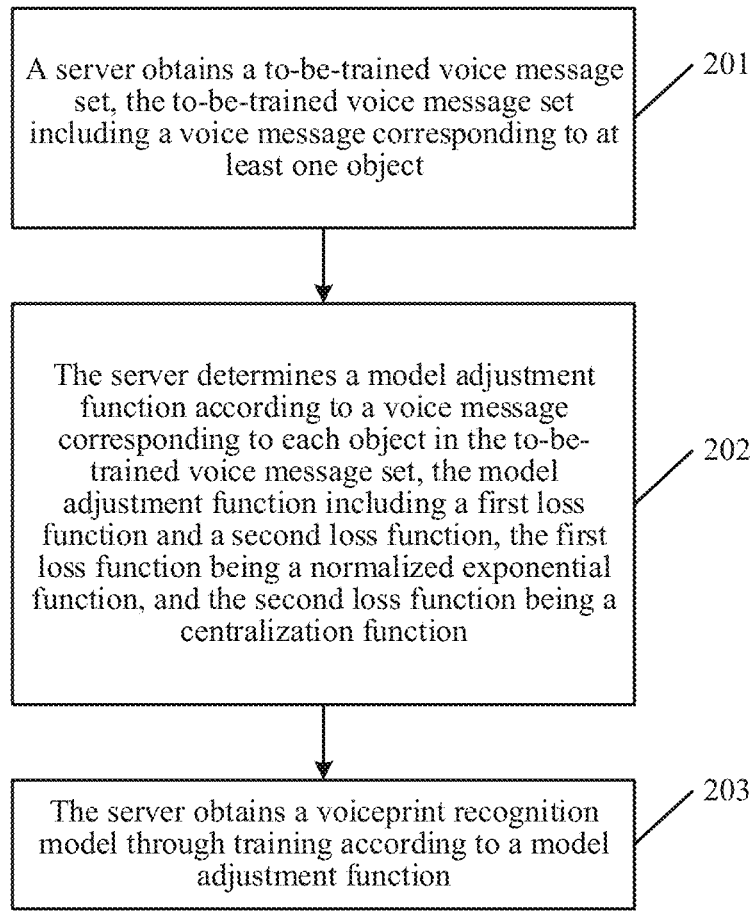
FIG. 5 is a schematic diagram of an embodiment of a model training method according to an embodiment of this application.

A model training method according to an embodiment of this application is described below from a perspective of a server. Referring to FIG. 5, an embodiment of the model training method according to an embodiment of this application includes the following steps.

201. A server obtains a to-be-trained voice message set, the to-be-trained voice message set including a voice message corresponding to at least one object.

In this embodiment, first, the server obtains the to-be-trained voice message set, and in the voice message set, a voice message of at least one object needs to be included.

Figure 6:
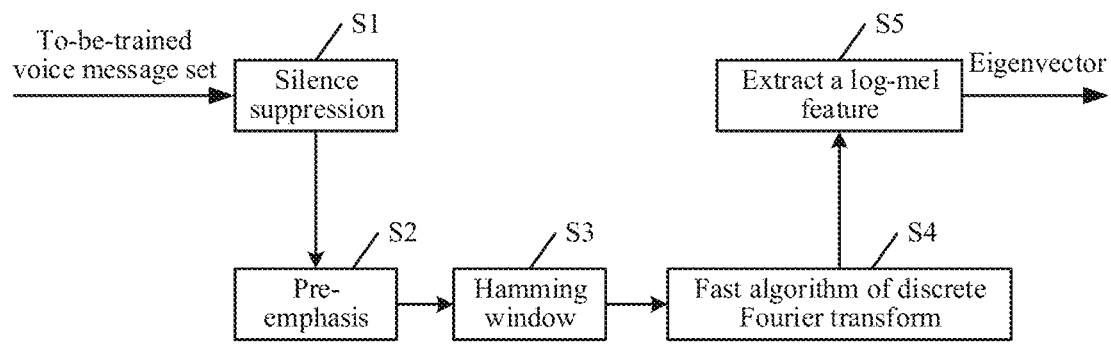
FIG. 6 is a schematic flowchart of pre-processing a voice message according to an embodiment of this application.

Optionally, the server also needs to pre-process each voice message in the to-be-trained voice message set. FIG. 6 is a schematic flowchart of pre-processing a voice message according to an embodiment of this application. As shown in the figure, optionally:

in step S1, voice activity detection (VAD) needs to be first performed on each voice message in the to-be-trained voice message set, an objective is to recognize and eliminate a long silent period from an audio signal flow, to save voice channel resources without degrading quality of service, thereby being conductive to reducing an end-to-end time delay perceived by a user.

There are two problems to which attention needs to be paid during silence detection: one is a background noise problem, that is, how to detect silence in relatively high background noise, and the other is a problem of front and rear edge cutting. The front and rear edge cutting is that, during voice restoration, because there is a specific determining threshold and a time delay between an actual speech and detected voice, beginning and end parts of a voice waveform are discarded as silence sometimes, and restored voice changes, a voice packet needs to be added before or after a burst voice packet for smoothing to resolve the problem.

In step S2, an objective of pre-emphasis is to enhance a high frequency part, emphasize a high frequency part of a voice message, and remove influence of lip radiation. Increasing high frequency resolution of voice enables a frequency spectrum of a signal to become flat, and maintains the frequency spectrum of the signal within an entire frequency band from a low frequency to a high frequency, so that the frequency spectrum may be obtained by using the same signal-to-noise ratio. A reason is that, for a voice signal, a low frequency band of voice has relatively high energy, the energy is mainly distributed in the low frequency band, and a power spectral density of the voice decreases as a frequency increases. In this case, an output of a frequency discriminator in a high frequency band has a notably signal-to-noise ratio decrease, resulting in weak high frequency transmission, and consequently, high frequency transmission becomes difficult, exerting large impact on quality of the signal. Therefore, the high frequency part of the signal is emphasized before transmission, and then, a receiving end performs de-emphasis, so that transmission quality of the signal can be improved.

In step S3, each frame of signal is usually multiplied by a smooth window function, both ends of the frame are attenuated smoothly to zero, so that intensity of side lobes after a Fourier transform may be reduced and a spectrum with higher quality may be obtained. For each frame, a window function is selected, and a width of the window function is a frame length. Common window functions include a rectangular window, a Hamming window, a Hanning window, and a Gaussian window.

In step S4, because in a transform of the signal in a time domain, it is usually difficult to tell characteristics of the signal, the signal is usually converted to an energy distribution on a frequency domain for observation. Different energy distributions may represent characteristics of different pieces of voices. After being multiplied by the Hamming window, the each frame also needs to be quickly pass through a Fourier transform to obtain an energy distribution in the frequency spectrum.

In step S5, after quickly passing through the Fourier transform, the each frame is passed through a Maya embedded language (Mel) filter to obtain a Mel spectrum, and a logarithm is further obtained. By then, pre-processing of the voice message is completed, so that an eigenvector is generated.

202. Determine a model adjustment function according to a voice message corresponding to each object in the to-be-trained voice message set, the model adjustment function including a first loss function and a second loss function, the first loss function being a normalized exponential function, and the second loss function being a centralization function.

In this embodiment, the server generates the first loss function and the second loss function according to the pre-processed voice message, obtains the model adjustment function by combining the first loss function and the second loss function, and adjusts the voiceprint recognition model by using the model adjustment function.

The voiceprint recognition model is obtained from the first loss function—a normalized exponential function (a softmax loss function) and the second loss function—a centralization function (a center loss function) through joint training.

203. The server obtains the voiceprint recognition model through training according to the model adjustment function.

In this embodiment, the server obtains the voiceprint recognition model through training and learning according to the obtained model adjustment function. After a to-be-recognized voice message is received, the to-be-recognized target voice message is inputted into the voiceprint recognition model, and then, corresponding target feature information is outputted by the voiceprint recognition model.

In this embodiment of this application, a model training method is provided, that is, the server obtains the to-be-trained voice message set first, the to-be-trained voice message set including a voice message corresponding to at least one object, and then, the server determines the model adjustment function according to a voice message corresponding to each object in the to-be-trained voice message set, the model adjustment function including a first loss function and a second loss function, the first loss function being a normalized exponential function and the second loss function being a centralization function. Finally, the voiceprint recognition model is obtained through training according to the model adjustment function. In the foregoing manner, the normalized exponential function and the centralization function are used for jointly optimizing the voiceprint recognition model, the normalized exponential function, as a loss function, can effectively improve discrimination between different speakers in a depth feature space, and the centralization function, as a loss function, can further reduce an intra-class variation between the depth features of the same speaker. Two loss functions are used for simultaneously supervising and learning the voiceprint recognition model, and enable the depth feature to have better discrimination, thereby improving recognition performance.

Optionally, based on the embodiment corresponding to FIG. 5, in a first optional embodiment of a model training method according to an embodiment of this application, that the server determines a model adjustment function according to a voice message corresponding to each object in the to-be-trained voice message set may include:

determining, by the server, a depth feature of each voice message by using a CNN;

obtaining, by the server, a fully connected layer weight matrix according to the voice message corresponding to the each object in the to-be-trained voice message set; and determining, by the server, the first loss function according to the depth feature of the each voice message and the fully connected layer weight matrix.

Figure 7:
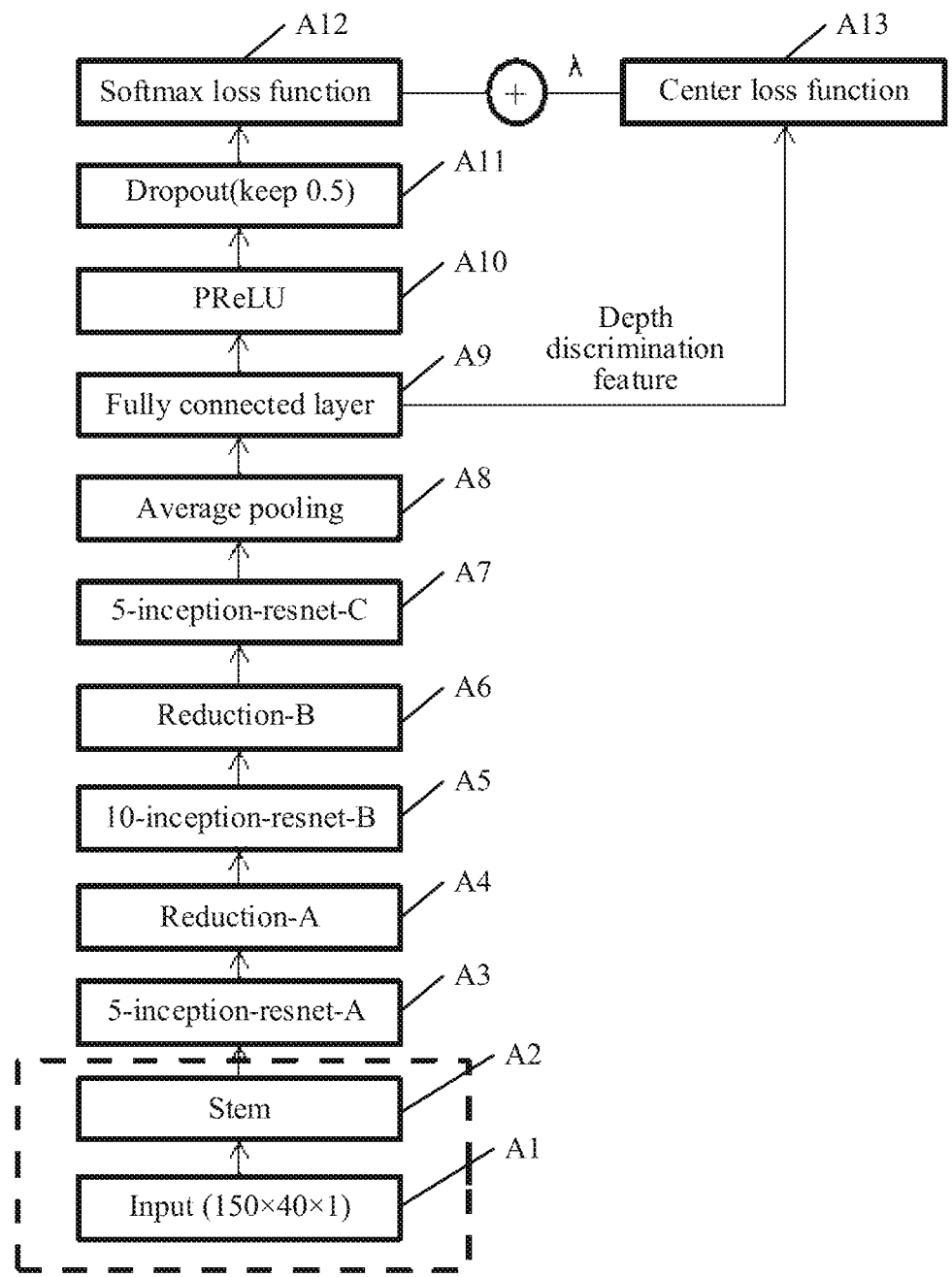
FIG. 7 is a schematic diagram of an overall structure of a convolutional neural network according to an embodiment of this application.
Figure 8:
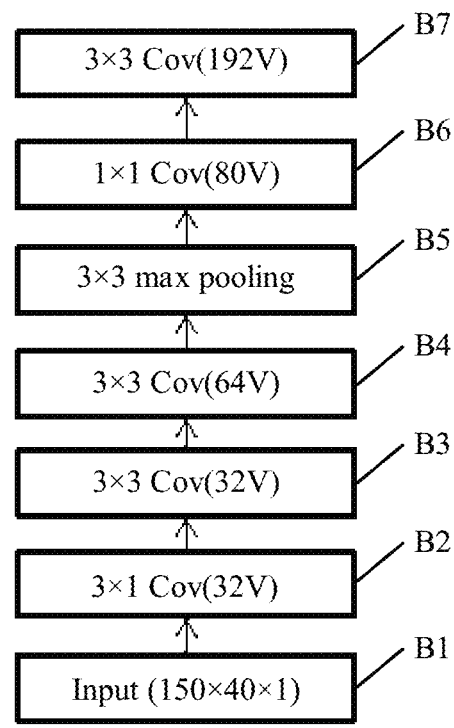
FIG. 8 is a schematic diagram of a partial structure of a convolutional neural network according to an embodiment of this application.

In this embodiment, the server uses a deep CNN based on an Inception-ResNet structure to generate the model adjustment function. For ease of understanding, FIG. 7 is a schematic diagram of an overall structure of a convolutional neural network according to an embodiment of this application. As shown in the figure, the entire structure includes submodules Inception-ResNet-A, Inception-ResNet-B, Inception-ResNet-C, Reduction-A, and Reduction-B. For a module A1 and a module A2, a structure shown in FIG. 8 is specifically included. FIG. 8 is a schematic diagram of a partial structure of a convolutional neural network according to an embodiment of this application. Considering a feature of an inputted voice message, an asymmetric convolution kernel is used in a first convolutional layer, so that a convolution having a larger amplitude in a time axis direction may be performed.

A depth feature of an entire sentence is learned of based on the improved Inception-ResNet structure. During a training process, a voice segment with a fixed duration is captured from each piece of voice and used as a network input in a form of a picture. With reference to a given trained network, a speaker feature of a sentence level is obtained by calculating a mean of speaker features corresponding to the inputted voice segment.

Second, in this embodiment of this application, a manner in which the server determines the model adjustment function according to a voice message corresponding to each object in the to-be-trained voice message set may be determining a depth feature of each voice message by using the CNN first, then obtaining a fully connected layer weight matrix according to the voice message corresponding to the each object in the to-be-trained voice message set, and finally, determining the first loss function according to the depth feature of the each voice message and the fully connected layer weight matrix. In the foregoing manner, a feasible implementation is provided for implementing the solution, thereby improving practicality and feasibility of the solution.

Optionally, based on the first embodiment corresponding to FIG. 5, in second optional embodiment of a model training method according to an embodiment of this application, the determining, by the server, the first loss function according to the depth feature of the each voice message and the fully connected layer weight matrix may include:

determining, by the server, the first loss function in the following manner:

$$L_s = -\sum_{i=1}^{M} \log \frac{e^{W_{y_i}^T x_i + b_{y_i}}}{\sum_{j=1}^{N} e^{W_j^T x_i + b_j}}$$

where $L_s$ represents the first loss function, $x_i$ represents the $i^{th}$ depth feature from the $y_i^{th}$ object, $W_v$ represents the $v^{th}$ column in the fully connected layer weight matrix, $b_j$ represents a bias of the $j^{th}$ class, each class corresponding to an object, M represents a group size of a training set corresponding to the to-be-trained voice message set, and N represents a quantity of objects corresponding to the to-be-trained voice message set.

In this embodiment, a specific manner of calculating a first loss function is described. Calculation is performed by using the following formula:

$$L_s = -\sum_{i=1}^{M} \log \frac{e^{W_{y_i}^T x_i + b_{y_i}}}{\sum_{j=1}^{N} e^{W_j^T x_i + b_j}}$$

where an input of a log function is a result of softmax, $L_s$ represents the result of a softmax loss, and wx+b represents an output of a fully connected layer. Therefore, an input of a log represents a probability that $x_i$ belongs to a class $y_i$.

Further, in this embodiment of this application, a specific manner of obtaining a first loss function is provided, that is, the first loss function is determined by the server according to the depth feature of the each voice message and the fully connected layer weight matrix. In the foregoing manner, feasibility and operability of the solution are improved.

Optionally, based on the embodiment corresponding to FIG. 5, in a third optional embodiment of a model training method according to an embodiment of this application, that the server determines a model adjustment function according to a voice message corresponding to each object in the to-be-trained voice message set may include:

determining, by the server, a depth feature of each voice message by using a CNN;

calculating, by the server a depth feature gradient according to the depth feature of the each voice message;

calculating, by the server a second voice mean according to the depth feature gradient and a first voice mean; and determining, by the server, a second loss function according to the depth feature of the each voice message and the second voice mean.

In this embodiment, a manner of determining the second loss function—a center loss function is described. In a process of determining the second loss function, a mini-batch gradient descent method needs to be used, and only a small part of a total training set is used for training each time. For example, there are 5000 samples, each time 100 samples are used for calculating a loss, and then, parameters are updated. After 50 times, training of the entire sample set, that is, a round of training, is completed A plurality of samples are used for calculating the loss during each update, so that calculation of the loss and an update of the parameters are more representative. The loss is decreased more stably, and calculation of small batches also reduces occupied computing resources.

In a calculation process of the gradient descent method, only a first-order derivative of the loss function needs to be calculated, and computational cost is relatively small, so that the gradient descent method can be applied to many large-scale data sets. A meaning of the gradient descent method is to find a new iteration point in a gradient direction of the current point.

Second, in this embodiment of this application, a manner of obtaining the second loss function is provided, that is, the server calculates a depth feature gradient according to the depth feature of the each voice message, calculates a second voice mean according to the depth feature gradient and the first voice mean, and finally, determines the second loss function according to the depth feature of the each voice message and the second voice mean. In the foregoing manner, a proper basis can be provided for implementing the solution, thereby improving practicality and feasibility of the solution.

Optionally, based on the third embodiments corresponding to FIG. 5, in a fourth optional embodiment of a model training method according to an embodiment of this application, that the server calculates a depth feature gradient according to the depth feature of the each voice message may include:

calculating the depth feature gradient in the following manner:

$$\Delta \mu_j = \frac{\sum_{i=1}^{M} \delta(y_i = j)(\mu_j - x_i)}{1 + \sum_{i=1}^{M} \delta(y_i = j)}$$

where $\Delta \mu_j$ represents the depth feature gradient, M represents a group size of a training set corresponding to the to-be-trained voice message set, j represents a class, each class corresponding to an object, and $y_i$ represents the $y_i^{th}$ object.

The calculating a second voice mean according to the depth feature gradient and a first voice mean may include:

calculating the second voice mean in the following manner:

$$\mu_j^{t+1} = \mu_j^t - \alpha \Delta \mu_j^t$$

where t represents a moment, $\mu_j^{t+1}$ represents the second voice mean corresponding to a moment t+1, $\mu_j^t$ represents the first voice mean corresponding to a moment t, $\Delta \mu_j^t$ represents the depth feature gradient corresponding to the moment t, and $\alpha$ represents a learning rate parameter, a value range of $\alpha$ being greater than or equal to 0 and less than or equal to 1.

The determining a second loss function according to the depth feature of the each voice message and the second voice mean may include: determining the second loss function in the following manner:

$$L_c = \sum_{i=1}^{M} \|x_i - \mu_{yi}\|_2^2$$

where $L_c$ represents the second loss function, $x_i$ represents the $i^{th}$ depth feature from the $y_i^{th}$ object, and $\mu_{yi}$ represents a mean of a depth discrimination feature from the $y_i^{th}$ object.

In this embodiment, a specific manner of calculating a second loss function is described That is, the server performs calculation by using the following formula:

$$L_c = \sum_{i=1}^{M} \|x_i - \mu_{yi}\|_2^2$$

where $\mu_{y_i}$ represents a mean of the depth discrimination feature from the speaker $y_i$. Means of all classes are updated in a mini-batch unit. In each training iteration step, the depth feature of the speaker appearing in the mini-batch is used for updating the mean of the corresponding speaker. Formulas for updating the mean are as follows:

$$\mu_j^{t+1} = \mu_j^t - \alpha \Delta \mu_j^t$$

$$\Delta \mu_j = \frac{\sum_{i=1}^{M} \delta(y_i = j)(\mu_j - x_i)}{1 + \sum_{i=1}^{M} \delta(y_i = j)}$$

where the gradient of the center loss function relative to $x_i$ is $\Delta \mu_j$. It would be better if a sum of squares of a distance between a feature of each sample in a batch and a center of the feature is smaller, that is, it would be better if an intra-class distance is smaller. This is a center loss.

Further, in this embodiment of this application, a specific manner of obtaining a second loss function is provided. In the foregoing manner, feasibility and operability of the solution are improved.

Optionally, based on FIG. 5 and any one of the first to fourth embodiments corresponding to FIG. 5, in a fifth optional embodiment of a model training method according to an embodiment of this application, that the server determines a model adjustment function according to a voice message corresponding to each object in the to-be-trained voice message set may include:

determining, by the server, the first loss function according to the voice message corresponding to the each object in the to-be-trained voice message set;

determining, by the server, the second loss function according to the voice message corresponding to the each object in the to-be-trained voice message set; and determining, by the server, the model adjustment function according to the first loss function and the second loss function.

In this embodiment, after obtaining the first loss function and the second loss function, the server performs joint processing on the first loss function and the second loss function, to obtain the model adjustment function.

Optionally, the first loss function is a softmax loss function, and the second loss function is a center loss function herein. If the loss is calculated by using only the softmax loss function, regardless of a training data set or a test data set, a clearer class boundary can be seen. If the center loss function is added on the basis of the softmax loss function, an inter-class distance increases, and an intra-class distance decreases.

Optionally, in this embodiment of this application, that the server determines a model adjustment function according to a voice message corresponding to each object in the to-be-trained voice message set may be specifically: the server determines the first loss function according to the voice message corresponding to the each object in the to-be-trained voice message set, and then the server determines the second loss function according to the voice message corresponding to the each object in the to-be-trained voice message set, and finally, the server determines the model adjustment function according to the first loss function and the second loss function. In the foregoing manner, feasibility and operability of the solution may be improved.

Optionally, based on the fifth embodiment corresponding to FIG. 5, in a sixth optional embodiment of a model training method according to an embodiment of this application, the determining the model adjustment function according to the first loss function and the second loss function may include:

determining, by a server, the model adjustment function in the following manner:

$$L_t = L_s + \lambda L_c$$

where $L_t$ represents the model adjustment function, $L_s$ represents the first loss function, $L_c$ represents the second loss function, and $\lambda$ represents a control parameter.

In this embodiment, a specific manner of calculating a model adjustment function is described. That is, the server performs calculation by using the following formula:

$$L_t = L_s + \lambda L_c = -\sum_{i=1}^{M} \log \frac{e^{W_{y_i}^T x_i + b_{y_i}}}{\sum_{j=1}^{N} e^{W_j^T x_j + b_j}} + \frac{\lambda}{2} \sum_{i=1}^{M} \|x_i - \mu_{y_i}\|_2^2$$

The loss function used in this embodiment of this application is a linear combination of the first loss function (the softmax loss function) and the second loss function (the center loss function), a weight of the first loss function is 1, and the weight of the second loss function is $\lambda$. M represents a quantity of samples included in a mini-batch, and N represents a quantity of classes.

Optionally, in this embodiment of this application, a specific calculating manner in which the server determines the model adjustment function according to the first loss function and the second loss function is described. In the foregoing manner, the control parameter may be used for controlling a proportion between the first loss function and the second loss function, thereby being conductive to improving reliability of calculation, and the server can perform adjustment according to different applications, thereby improving flexibility of the solution.

To verify an application effect of the voiceprint recognition method provided by the embodiments of this application, verification and comparison are performed on a large data set. The data set includes 760220 sentences from 2500 speakers, and each speaker has 300 sentences on average. An average duration of the data is 2.6 s. The data set is divided into three parts: a training set, a validation set, and a test set. For ease of understanding, Table 1 shows configuration statuses of different networks.

TABLE 1

| Network abbreviation | Infrastructure | Loss function | Feature dimension | Minimum duration of input |
|---|---|---|---|---|
| Net1 | Inception-ResNet-v1 | Softmax + Center | 120 | 1.5 s |
| Net2 | Inception-ResNet-v1 | Softmax + Center | 120 | 2.0 s |
| Net3 | Inception-ResNet-v1 | Softmax + Center | 120 | 2.5 s |
| Net4 | Network provided by this embodiment of this application | Softmax | 40 | 1.5 s |
| Net5 | Network provided by this embodiment of this application | Softmax + Center | 40 | 1.5 s |

Figure 9:
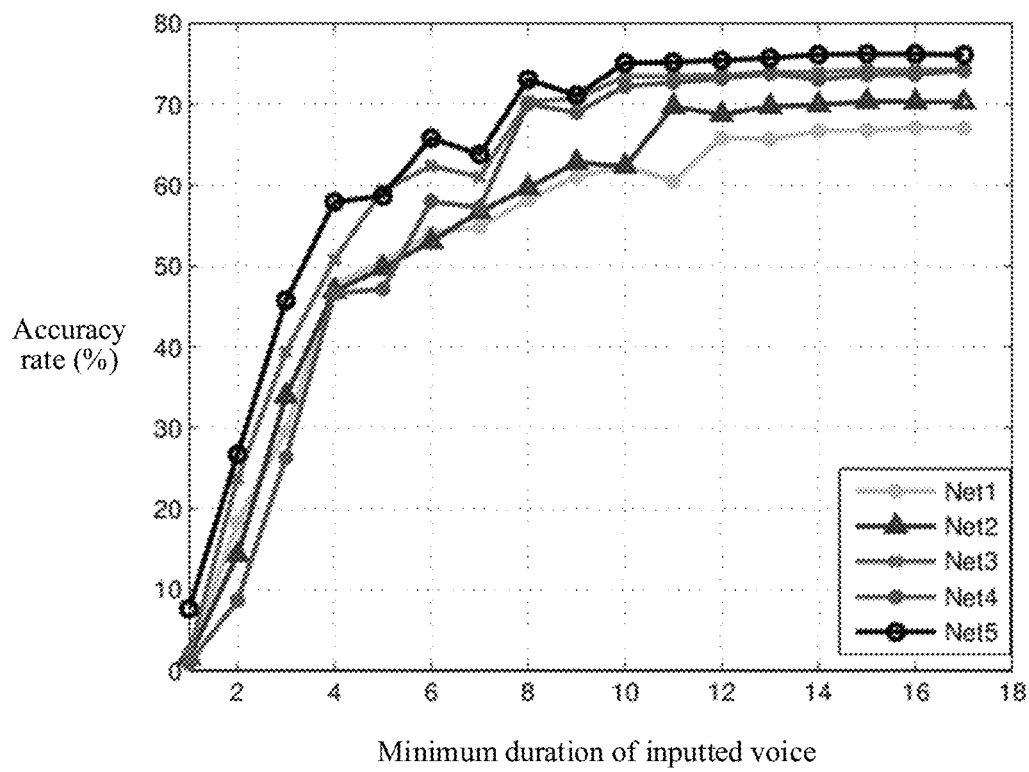
FIG. 9 is a schematic diagram of comparison between accuracy rates of a validation set applied to different networks according to an embodiment of this application.

For the Inception-ResNet-v1 network, to ensure normal training of the network, a 120-dimensional log-mel feature is used as an input of the network. FIG. 9 is a schematic diagram of comparison between accuracy rates of a validation set applied to different networks according to an embodiment of this application. As shown in the figure, using two loss functions for optimizing network training at the same time is better than individually using the softmax loss function, and a network structure of this embodiment of this application may achieve the highest accuracy rate on the verification set when an inputted feature has a smaller dimension and a minimum duration of inputted voice is the shortest.

A system provided by this embodiment of this application is compared with a system based on a deep neural network (DNN)/identity vector (i-vector) below. Table 2 shows performance comparison between the system provided by this embodiment of this application and the DNN/i-vector-based system.

TABLE 2

| Scoring method | Short voice (1.5 s) | | Long voice (>10 s) | |
|---|---|---|---|---|
| | Depth discrimination feature | DNN/I-vector | Depth discrimination feature | DNN/I-vector |
| Cosine distance | 2.10 | 4.88 | 0.46 | 0.19 |
| PLDA | 1.96 | 2.76 | 0.52 | 0.11 |

It may be seen from Table 2 that the voiceprint recognition method provided by this embodiment of this application is remarkably better than the existing DNN/I-vector-based method in a case of short voice, and is slightly different from the DNN/I-vector-based method in terms of performance in a case of long voice. However, for the short voice, a speaker recognition system based on the depth discrimination feature does not need complex process design, and therefore, application efficiency of the solution is improved.

Figure 10:
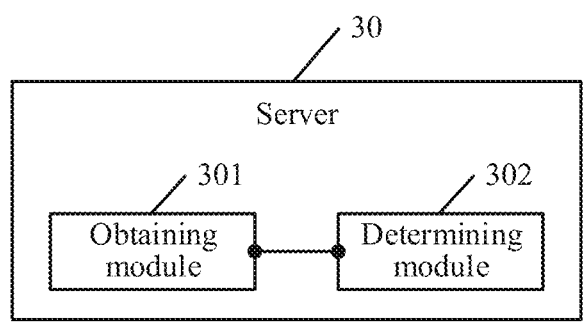
FIG. 10 is a schematic diagram of an embodiment of a server according to an embodiment of this application.

The server in this embodiment of this application is described in detail below. FIG. 10 is a schematic diagram of an embodiment of a server according to an embodiment of this application. A server 30 includes one or more processors and one or more memories storing program modules, the program modules being executed by the processor and including:

an obtaining module 301, configured to obtain a to-be-recognized target voice message, the obtaining module 301 being further configured to obtain target feature information of the target voice message by using a voiceprint recognition model, the voiceprint recognition model being obtained through training according to a first loss function and a second loss function, the first loss function being a normalized exponential function, and the second loss function being a centralization function; and a determining module 302, configured to determine a voiceprint recognition result according to the target feature information obtained by the obtaining module 301 and registration feature information, the registration feature information being obtained after a voice message of the to-be-recognized object passes through the voiceprint recognition model.

In this embodiment of this application, the obtaining module 301 obtains the to-be-recognized target voice message, the obtaining module 301 obtains the target feature information of the target voice message by using the voiceprint recognition model, the voiceprint recognition model being obtained through training according to the first loss function and the second loss function, the first loss function being a normalized exponential function, the second loss function being a centralization function. The determining module 302 determines the voiceprint recognition result according to the target feature information obtained by the obtaining module 301 and registration feature information, the registration feature information being obtained after the voice message of the to-be-recognized object passes through the voiceprint recognition model.

In the embodiments of this application, a server is provided. First, the server obtains a to-be-recognized target voice message, and then the server obtains the target feature information of the target voice message by using the voiceprint recognition model, the voiceprint recognition model being obtained through training according to the first loss function and the second loss function, the first loss function being a normalized exponential function, and the second loss function being a centralization function. The server determines the voiceprint recognition result according to the target feature information and the registration feature information, the registration feature information being obtained after the voice message of the to-be-recognized object passes through the voiceprint recognition model. In the foregoing manner, the normalized exponential function and the centralization function are used for jointly optimizing the voiceprint recognition model, the normalized exponential function, as a loss function, can effectively improve discrimination between different speakers in a depth feature space, and the centralization function, as a loss function, can optionally reduce an intra-class variation between the depth features of the same speaker. Two loss functions are used for simultaneously supervising and learning the voiceprint recognition model, and enable the depth feature to have better discrimination, thereby improving recognition performance.

Optionally, based on the embodiment corresponding to FIG. 10, in another embodiment of the server 30 according to an embodiment of this application, the determining module 302 is specifically configured to: calculate a cosine similarity according to the target feature information and the registration feature information;

determine that the target voice message is a voice message of the to-be-recognized object in a case that the cosine similarity reaches a first similarity threshold; and determine that the target voice message is not a voice message of the to-be-recognized object in a case that the cosine similarity does not reach the first similarity threshold.

Second, in this embodiment of this application, in a process that the server determines the voiceprint recognition result according to the target feature information and the registration feature information, the cosine similarity may be calculated first according to the target feature information and the registration feature information. If the cosine similarity reaches the first similarity threshold, the server determines that the target voice message is a voice message of the to-be-recognized object. If the cosine similarity does not reach the first similarity threshold, the server determines that the target voice message is not a voice message of the to-be-recognized object. In the foregoing manner, the cosine similarity is to distinguish a difference in terms of direction, and is mainly used for distinguishing a similarity and a difference between users by using scores of the users on the content, and in addition, a problem of inconsistent metrics that possibly exists between the users is fixed, thereby being conductive to improving reliability of the voiceprint recognition result.

Optionally, based on the embodiment corresponding to FIG. 10, in another embodiment of the server 30 according to an embodiment of this application, the determining module 302 is specifically configured to: calculate a log-likelihood ratio between the target feature information and the registration feature information by using a PLDA classifier;

determine that the target voice message is a voice message of the to-be-recognized object in a case that the log-likelihood ratio reaches a second similarity threshold; and determine that the target voice message is not a voice message of the to-be-recognized object in a case that the log-likelihood ratio does not reach the second similarity threshold.

Second, in this embodiment of this application, in a process in which the server determines the voiceprint recognition result according to the target feature information and the registration feature information, the log-likelihood ratio between the target feature information and the registration feature information may be calculated by using the PLDA classifier first. If the log-likelihood ratio reaches the second similarity threshold, the server determines that the target voice message is a voice message of the to-be-recognized object. If the log-likelihood ratio does not reach the second similarity threshold, the server determines that the target voice message is not a voice message of the to-be-recognized object. In the foregoing method, the PLDA is used as a channel compensation algorithm, a channel compensation capability thereof is better than a conventional linear discriminant analysis classifier, thereby being conductive to improving reliability of the voiceprint recognition result.

Figure 11:
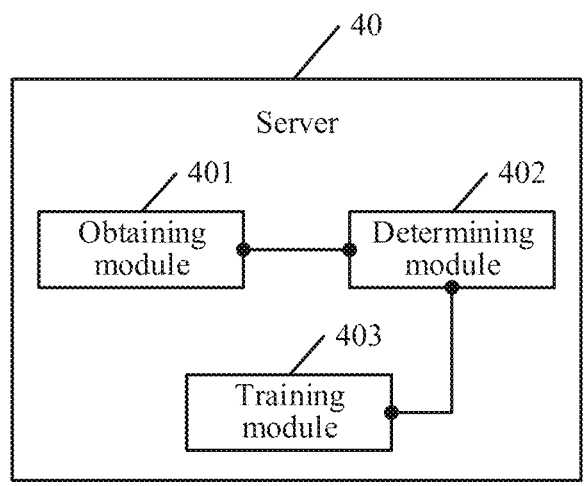
FIG. 11 is a schematic diagram of another embodiment of a server according to an embodiment of this application.

The server in this embodiment of this application is described in detail below. FIG. 11 is a schematic diagram of an embodiment of a server according to an embodiment of this application. A server 40 includes one or more processors and one or more memories storing program modules, the program modules being executed by the processor and including:

an obtaining module 401, configured to obtain a to-be-trained voice message set, the to-be-trained voice message set including a voice message corresponding to at least one object;

a determining module 402, configured to determine a model adjustment function according to a voice message corresponding to each object in the to-be-trained voice message set obtained by the obtaining module 401, the model adjustment function including a first loss function and a second loss function, the first loss function being a normalized exponential function, and the second loss function being a centralization function;

a training module 403, configured to perform training according to the model adjustment function determined by the determining module 402, to obtain a voiceprint recognition model.

In this embodiment of this application, the obtaining module 401 obtains the to-be-trained voice message set, the to-be-trained voice message set including the voice message corresponding to at least one object. The determining module 402 determines the model adjustment function according to a voice message corresponding to each object in the to-be-trained voice message set obtained by the obtaining module 401, the model adjustment function including a first loss function and a second loss function, the first loss function being the normalized exponential function, and the second loss function being the centralization function. The training module 403 obtains the voiceprint recognition model through training according to the model adjustment function determined by the determining module 402.

In this embodiment of this application, a model training method is provided, that is, the server obtains the to-be-trained voice message set first, the to-be-trained voice message set including a voice message corresponding to at least one object, and then, the server determines the model adjustment function according to a voice message corresponding to each object in the to-be-trained voice message set, the model adjustment function including a first loss function and a second loss function, the first loss function being a normalized exponential function and the second loss function being a centralization function. Finally, the voiceprint recognition model is obtained through training according to the model adjustment function. In the foregoing manner, the normalized exponential function and the centralization function are used for jointly optimizing the voiceprint recognition model, the normalized exponential function, as a loss function, can effectively improve discrimination between different speakers in a depth feature space, and the centralization function, as a loss function, can further reduce an intra-class variation between the depth features of the same speaker. Two loss functions are used for simultaneously supervising and learning the voiceprint recognition model, and enable the depth feature to have better discrimination, thereby improving recognition performance.

Optionally, based on the embodiment corresponding to FIG. 11, in another embodiment of the server 40 according to an embodiment of this application, the determining module 402 is specifically configured to determine a depth feature of each voice message by using a CNN;

obtain a fully connected layer weight matrix according to the voice message corresponding to the each object in the to-be-trained voice message set, and determine the first loss function according to the depth feature of the each voice message and the fully connected layer weight matrix.

Second, in this embodiment of this application, a manner in which the server determines the model adjustment function according to a voice message corresponding to each object in the to-be-trained voice message set may be determining a depth feature of each voice message by using the CNN first, then obtaining a fully connected layer weight matrix according to the voice message corresponding to the each object in the to-be-trained voice message set, and finally, determining the first loss function according to the depth feature of the each voice message and the fully connected layer weight matrix. In the foregoing manner, a feasible implementation is provided for implementing the solution, thereby improving practicality and feasibility of the solution.

Optionally, based on the embodiment corresponding to FIG. 11, in another embodiment of the server 40 according to an embodiment of this application, the determining module 402 is specifically configured to determine the first loss function in the following manner:

$$L_s = -\sum_{i=1}^{M} \log \frac{e^{W_{y_i}^T x_i + b_{y_i}}}{\sum_{j=1}^{N} e^{W_v^T x_i + b_j}}$$

where $L_s$ represents the first loss function, $x_i$ represents the $i^{th}$ depth feature from the $y_i^{th}$ object, $W_v$ represents the $v^{th}$ column in the fully connected layer weight matrix, $b_j$ represents a bias of the $j^{th}$ class, each class corresponding to an object, M represents a group size of a training set corresponding to the to-be-trained voice message set, and N represents a quantity of objects corresponding to the to-be-trained voice message set.

Further, in this embodiment of this application, a specific manner of obtaining a first loss function is provided, that is, the first loss function is determined according to the depth feature of the each voice message and the fully connected layer weight matrix. In the foregoing manner, feasibility and operability of the solution are improved.

Optionally, based on the embodiment corresponding to FIG. 11, in another embodiment of the server 40 according to an embodiment of this application, the determining module 402 is specifically configured to determine a depth feature of each voice message by using a CNN;

calculate a depth feature gradient according to the depth feature of the each voice message;

calculate a second voice mean according to the depth feature gradient and a first voice mean; and determine a second loss function according to the depth feature of the each voice message and the second voice mean.

Second, in this embodiment of this application, a manner of obtaining the second loss function is provided, that is, the server calculates a depth feature gradient according to the depth feature of the each voice message, calculates a second voice mean according to the depth feature gradient and the first voice mean, and finally, determines the second loss function according to the depth feature of the each voice message and the second voice mean. In the foregoing manner, a proper basis can be provided for implementing the solution, thereby improving practicality and feasibility of the solution.

Optionally, based on the embodiment corresponding to FIG. 11, in another embodiment of the server 40 according to an embodiment of this application, the determining module 402 is specifically configured to: calculate the depth feature gradient in the following manner:

$$\Delta\mu_j = \frac{\sum_{i=1}^{M} \delta(y_i = j)(\mu_j - x_i)}{1 + \sum_{i=1}^{M} \delta(y_i = j)}$$

where $\Delta\mu_j$ represents the depth feature gradient, M represents a group size of a training set corresponding to the to-be-trained voice message set, j represents a class, each class corresponding to an object, and $y_i$ represents the $y_i^{th}$ object; and the second voice mean is calculated in the following manner:

$$\mu_j^{t+1} = \mu_j^t - \alpha\Delta\mu_j^t$$

where t represents a moment, $\mu_j^{t+1}$ represents the second voice mean corresponding to a moment t+1, $\mu_j^t$ represents the first voice mean corresponding to a moment t, $\Delta\mu_j^t$ represents the depth feature gradient corresponding to the moment t, and α represents a learning rate parameter, a value range of α being greater than or equal to 0 and less than or equal to 1; and determine the second loss function in the following manner:

$$L_c = \sum_{i=1}^{M} \|x_i - \mu_{yi}\|_2^2$$

where $L_c$ represents the second loss function, $x_i$ represents the $i^{th}$ depth feature from the $y_i^{th}$ object, and $\mu_{yi}$ represents a mean of a depth discrimination feature from the $y_i^{th}$ object.

Further, in this embodiment, a specific manner of obtaining a second loss function is provided. In the foregoing manner, feasibility and operability of the solution are improved.

Optionally, based on the embodiment corresponding to FIG. 11, in another embodiment of the server 40 according to an embodiment of this application, the determining module 402 is specifically configured to: determine the first loss function according to the voice message corresponding to the each object in the to-be-trained voice message set;

determine the second loss function according to the voice message corresponding to the each object in the to-be-trained voice message set; and determine the model adjustment function according to the first loss function and the second loss function.

Optionally, in this embodiment of this application, that the server determines a model adjustment function according to a voice message corresponding to each object in the to-be-trained voice message set may be specifically: the server determines the first loss function according to the voice message corresponding to the each object in the to-be-trained voice message set, and then the server determines the second loss function according to the voice message corresponding to the each object in the to-be-trained voice message set, and finally, the server determines the model adjustment function according to the first loss function and the second loss function. In the foregoing manner, feasibility and operability of the solution may be improved.

Optionally, based on the embodiment corresponding to FIG. 11, in another embodiment of the server 40 according to an embodiment of this application, the determining module 402 is specifically configured to: determine the model adjustment function in the following manner:

$$L_t = L_s + \lambda L_c$$

where $L_t$ represents the model adjustment function, $L_s$ represents the first loss function, $L_c$ represents the second loss function, and λ represents a control parameter.

Optionally, in this embodiment of this application, a specific calculating manner in which the server determines the model adjustment function according to the first loss function and the second loss function is described. In the foregoing manner, the control parameter may be used for controlling a proportion between the first loss function and the second loss function, thereby being conductive to improving reliability of calculation, and the server can perform adjustment according to different applications, thereby improving flexibility of the solution.

Figure 12:
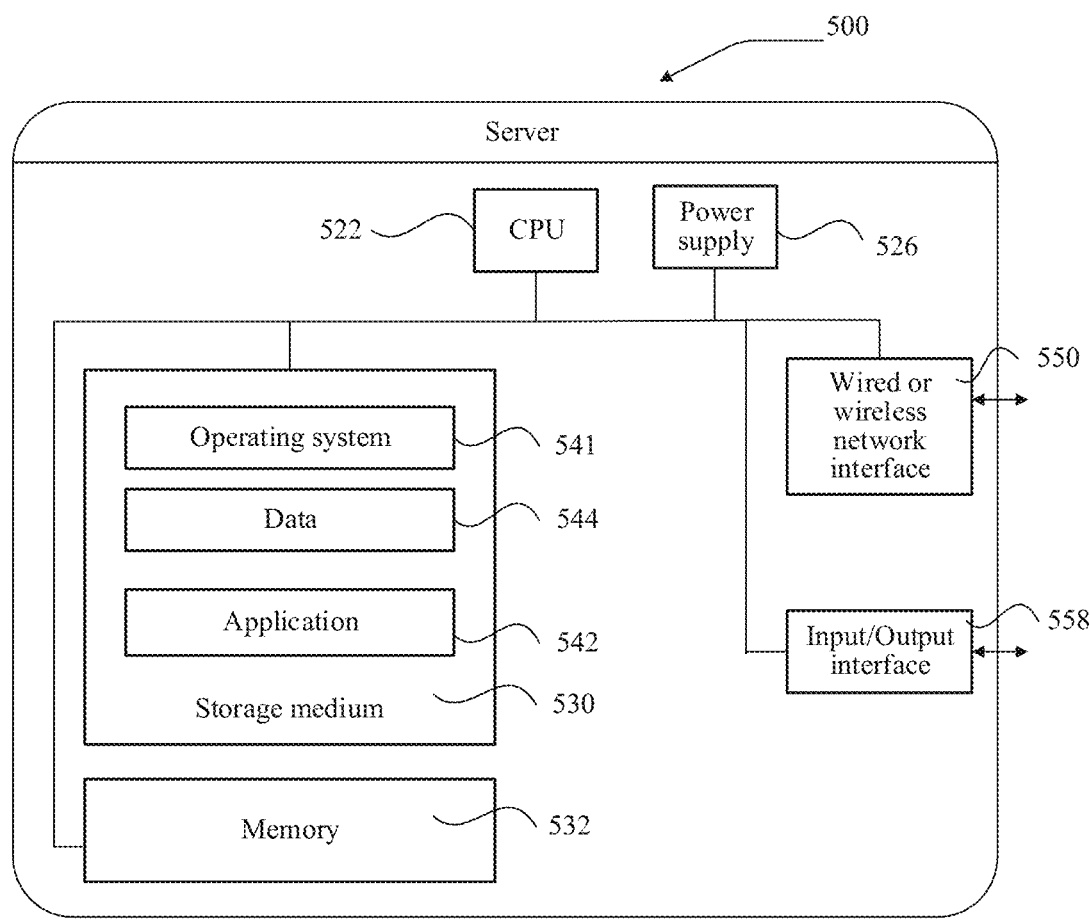
FIG. 12 is a schematic structural diagram of a server according to an embodiment of this application.

FIG. 12 is a schematic structural diagram of a server according to an embodiment of this application. The server 500 may vary greatly due to different configurations or performance, and may include one or more central processing units (CPUs) 522 (for example, one or more processors) and a memory 532, and one or more storage media 530 (for example, one or more mass storage devices) that store application programs 542 or data 544. The memory 532 and the storage medium 530 may be temporary storage or persistent storage. A program stored in the storage medium 530 may include one or more modules (which are not marked in the figure), and each module may include a series of instruction operations on the server. Further, the CPU 522 may be set to communicate with the storage medium 530, and perform, on the server 500, the series of instruction operations in the storage medium 530.

The server 500 may further include one or more power supplies 526, one or more wired or wireless network interfaces 550, one or more input/output interfaces 558, and/or one or more operating systems 541 such as Windows Server™, Mac OS X™, Unix™, Linux™, or FreeBSD™.

The steps performed by the server in the foregoing embodiment may be based on the server structure shown in FIG. 12.

In this embodiment of this application, the CPU 522 is configured to perform the following steps:

obtaining a to-be-recognized target voice message;

obtaining target feature information of the target voice message by using a voiceprint recognition model, the voiceprint recognition model being obtained through training according to a first loss function and a second loss function, the first loss function being a normalized exponential function, and the second loss function being a centralization function; and determining a voiceprint recognition result according to the target feature information and registration feature information, the registration feature information being obtained after a voice message of the to-be-recognized object passes through the voiceprint recognition model.

Optionally, in this embodiment of this application, the CPU 522 is specifically configured to perform the following steps:

calculating a cosine similarity according to the target feature information and the registration feature information;

determining that the target voice message is a voice message of the to-be-recognized object in a case that the cosine similarity reaches a first similarity threshold; and determining that the target voice message is not a voice message of the to-be-recognized object in a case that the cosine similarity does not reach the first similarity threshold.

Optionally, in this embodiment of this application, the CPU 522 is specifically configured to perform the following steps:

calculating a log-likelihood ratio between the target feature information and the registration feature information by using a PLDA classifier;

determining that the target voice message is a voice message of the to-be-recognized object in a case that the log-likelihood ratio reaches a second similarity threshold; and determining that the target voice message is not a voice message of the to-be-recognized object in a case that the log-likelihood ratio does not reach the second similarity threshold.

In this embodiment of this application, the CPU 522 is configured to perform the following steps:

obtaining a to-be-trained voice message set, the to-be-trained voice message set including a voice message corresponding to at least one object;

determining a model adjustment function according to a voice message corresponding to each object in the to-be-trained voice message set, the model adjustment function including a first loss function and a second loss function, the first loss function being a normalized exponential function, and the second loss function being a centralization function; and performing training according to the model adjustment function, to obtain a voiceprint recognition model.

Optionally, in this embodiment of this application, the CPU 522 is specifically configured to perform the following steps:

determining a depth feature of each voice message by using a CNN;

obtaining a fully connected layer weight matrix according to the voice message corresponding to the each object in the to-be-trained voice message set; and determining the first loss function according to the depth feature of the each voice message and the fully connected layer weight matrix.

Optionally, in this embodiment of this application, the CPU 522 is specifically configured to perform the following steps:

determining the first loss function in the following manner:

$$L_s = -\sum_{i=1}^{M} \log \frac{e^{W_{y_i}^T x_i + b_{y_i}}}{\sum_{j=1}^{N} e^{W_{y_j}^T x_i + b_j}}$$

where $L_s$ represents the first loss function, $x_i$ represents the $i^{th}$ depth feature from the $y_i^{th}$ object, $W_y$ represents the $v^{th}$ column in the fully connected layer weight matrix, $b_j$ represents a bias of the $j^{th}$ class, each class corresponding to an object, M represents a group size of a training set corresponding to the to-be-trained voice message set, and N represents a quantity of objects corresponding to the to-be-trained voice message set.

Optionally, in this embodiment of this application, the CPU 522 is specifically configured to perform the following steps:

determining a depth feature of each voice message by using a CNN;

calculating a depth feature gradient according to the depth feature of the each voice message;

calculating a second voice mean according to the depth feature gradient and a first voice mean; and determining a second loss function according to the depth feature of the each voice message and the second voice mean.

Optionally, in this embodiment of this application, the CPU 522 is specifically configured to perform the following steps:

calculating the depth feature gradient in the following manner:

$$\Delta\mu_j = \frac{\sum_{i=1}^{M} \delta(y_i = j)(\mu_j - x_i)}{1 + \sum_{i=1}^{M} \delta(y_i = j)}$$

where $\Delta\mu_j$ represents the depth feature gradient, M represents a group size of a training set corresponding to the to-be-trained voice message set, j represents a class, each class corresponding to an object, and $y_i$ represents the $y_i^{th}$ object;

calculating the second voice mean in the following manner:

$$\mu_j^{t+1} = \mu_j^t - \alpha\Delta\mu_j^t$$

where t represents a moment, $\mu_j^{t+1}$ represents the second voice mean corresponding to a moment t+1, $\mu_j^t$ represents the first voice mean corresponding to a moment t, $\Delta\mu_j^t$ represents the depth feature gradient corresponding to the moment t, and α represents a learning rate parameter, a value range of α being greater than or equal to 0 and less than or equal to 1; and determining the second loss function in the following manner:

$$L_c = \sum_{i=1}^{M} \|x_i - \mu_{yi}\|_2^2$$

where $L_c$ represents the second loss function, $x_i$ represents the $i^{th}$ depth feature from the $y_i^{th}$ object, and $\mu_{yi}$ represents a mean of a depth discrimination feature from the $y_i^{th}$ object.

Optionally, in this embodiment of this application, the CPU 522 is specifically configured to perform the following steps:

determining the first loss function according to the voice message corresponding to the each object in the to-be-trained voice message set;

determining the second loss function according to the voice message corresponding to the each object in the to-be-trained voice message set; and determining the model adjustment function according to the first loss function and the second loss function.

Optionally, in this embodiment of this application, the CPU 522 is specifically configured to perform the following steps:

determining the model adjustment function in the following manner:

$$L_t = L_s + \lambda L_c$$

where $L_t$ represents the model adjustment function, $L_s$ represents the first loss function, $L_c$ represents the second loss function, and $\lambda$ represents a control parameter.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In some embodiments provided in the embodiments of this application, it is to be understood that the disclosed system, apparatus, and method may be implemented in other manners. For example, the described apparatus embodiments above are merely exemplary. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. The modules or units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application can be integrated into one processing unit, or each of the units can exist alone physically, or two or more units are integrated into one unit. The foregoing integrated unit can be implemented in the form of hardware, or can be implemented in the form of a software function unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely provided for describing the technical solutions of the embodiments of this application, but not intended to limit this application. A person of ordinary skill in the art shall understand that although the embodiments of this application have been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

INDUSTRIAL APPLICABILITY

In this application, a to-be-recognized target voice message is obtained, target feature information of the target voice message is obtained by using a voice recognition model, the voice recognition model being obtained through training according to a first loss function and a second loss function, the first loss function being a normalized exponential function, and the second loss function being a centralization function; and a voiceprint recognition result is determined according to the target feature information and registration feature information, the registration feature information being obtained after a voice message of the to-be-recognized object passes through the voice recognition model. The normalized exponential function and the centralization function are used for jointly optimizing the voice recognition model, and can reduce an intra-class variation between depth features from the same speaker. Two functions are used for simultaneously supervising and learning the voice recognition model, and enable depth feature to have better discrimination, thereby improving recognition performance.

What is claimed is:

1. A voiceprint recognition method, comprising:
    obtaining a target voice message;
    obtaining text-independent target feature information of the target voice message by using a voiceprint recognition model, the voiceprint recognition model obtained through training according to a first loss function and a second loss function, the first loss function being a normalized exponential function that discriminates between deep features associated with different objects, and the second loss function being a centralization function that reduces variations in the deep features associated with the same object, and the voiceprint recognition model is obtained through training a convolutional neural network (CNN) by:
obtaining a voice message set comprising voice messages corresponding to multiple training objects;
capturing, from the voice messages, voice segments;
inputting the captured voice segments to the CNN to obtain a deep feature of a sentence level for each of the voice messages;
training the CNN as the voiceprint recognition model by joint supervision of the deep features of the voice messages corresponding to the training objects with the first loss function discriminating the deep features corresponding to different training objects in the voice messages and the second loss function reducing variations in the deep features of the same training object; and
determining a voiceprint recognition result by comparing the target feature information and registration feature information, the registration feature information obtained from a voice message of an object using the voiceprint recognition model.

2. The method according to claim 1, wherein determining the voiceprint recognition result comprises:
calculating a cosine similarity according to the target feature information and the registration feature information;
determining that the target voice message is a voice message of the object in accordance with a determination that the cosine similarity reaches a first similarity threshold; and
determining that the target voice message is not a voice message of the object in accordance with a determination that the cosine similarity does not reach the first similarity threshold.

3. The method according to claim 1, wherein determining the voiceprint recognition result comprises:
calculating a log-likelihood ratio between the target feature information and the registration feature information using a PLDA classifier;
determining that the target voice message is a voice message of the object in accordance with a determination that the log-likelihood ratio reaches a second similarity threshold; and
determining that the target voice message is not a voice message of the object in accordance with a determination that the log-likelihood ratio does not reach the second similarity threshold.

4. The method according to claim 1, wherein training the CNN further comprises:
determining, for each of the voice messages, a deep feature corresponding to the voice message using the CNN;
obtaining a fully connected layer weight matrix according to the voice messages; and
determining the first loss function according to the deep feature of each of the voice messages and the fully connected layer weight matrix.

5. The method according to claim 4, wherein determining the first loss function according to the deep feature of each of the voice messages and the fully connected layer weight matrix comprises:

determining the first loss function according to:

$$L_s = -\sum_{i=1}^{M} \log \frac{e^{W_{y_i}^T x_i + b_{y_i}}}{\sum_{j=1}^{N} e^{W_v^T x_i + b_j}},$$

wherein
$L_S$ represents the first loss function, $X_i$ represents representing the i th deep feature from the $y_i$ th object, $w_v$ represents the v th column in the fully connected layer weight matrix, $b_j$ represents a bias of the j th class, each class corresponding to an object, M represents a group size of a training set corresponding to the voice message set, and N represents a quantity of objects corresponding to the voice message set.

6. The method according to claim 1, wherein training the CNN further comprises:
determining, for each of the voice messages, a deep feature corresponding to the voice message using the CNN;
calculating a deep feature gradient according to the deep feature of each of the voice messages;
calculating a second voice mean according to the deep feature gradient and a first voice mean; and
determining the second loss function according to the deep feature of each of the voice messages and the second voice mean.

7. The method according to claim 6, wherein calculating the deep feature gradient according to the deep feature of each of the voice messages comprises:
calculating the deep feature gradient according to:

$$\Delta \mu_j = \frac{\sum_{i=1}^{M} \delta(y_i = j)(\mu_j - x_i)}{1 + \sum_{i=1}^{M} \delta(y_i = j)},$$

wherein
$\Delta\mu_j$ represents the deep feature gradient, M represents the group size of the training set corresponding to the voice message set, j represents a class, each class corresponding to an object, and $y_i$ represents representing the $y_i$ th object;
calculating the second voice mean according to the deep feature gradient and the first voice mean comprises:
calculating the second voice mean according to:
$\mu_j^{t+1} = \mu_j^t - \alpha \Delta \mu_j^t$, wherein
t represents a moment, $\mu_j^{t+1}$ represents the second voice mean corresponding to a moment t+1, $\mu_j$ represents the first voice mean corresponding to a moment t, $\Delta\mu_j^t$ represents the deep feature gradient corresponding to the moment t, and α represents a learning rate parameter, a value range of α being greater than or equal to 0 and less than or equal to 1; and
determining the second loss function according to the deep feature of each of the voice messages and the second voice mean comprises:
determining the second loss function according to:

$$L_c = \sum_{i=1}^{M} \|x_i - \mu_{y_i}\|_2^2 L_c = \sum_{i=1}^{M} \|x_i - \mu_{y_i}\|_2^2,$$

wherein $L_c$ represents the second loss function, $x^i$ represents the ith deep feature from the $y_i$ th object, and $\mu^{y_i}$ represents a mean of a deep discrimination feature from the $y_i$ th object.

8. The method according to claim 1, further comprising determining a model adjustment function according to the first loss function and the second loss function according to:

$$L_t = L_s + \lambda L_c$$

, wherein $L_t$ represents the model adjustment function, $L_s$ represents the first loss function, $L_c$ represents the second loss function, and $\lambda$ represents a control parameter.

9. A computer, comprising:
a memory;
a processor; and
a bus system connecting the memory to the processor, the memory configured to store a plurality of computer programs and the processor configured to execute the computer programs in the memory to perform a plurality of operations including:
obtaining a target voice message;
obtaining text-independent target feature information of the target voice message by using a voiceprint recognition model, the voiceprint recognition model obtained through training according to a first loss function and a second loss function, the first loss function being a normalized exponential function that discriminates between deep features associated with different objects, and the second loss function being a centralization function that reduces variations in the deep features associated with the same object, and the voiceprint recognition model is obtained through training a convolutional neural network (CNN) by:
obtaining a voice message set comprising voice messages corresponding to multiple training objects;
capturing, from the voice messages, voice segments;
inputting the captured voice segments to the CNN to obtain a deep feature of a sentence level for each of the voice messages;
training the CNN as the voiceprint recognition model by joint supervision of the deep features of the voice messages corresponding to the training objects with the first loss function discriminating the deep features corresponding to different training objects in the voice messages and the second loss function reducing variations in the deep features of the same training object and
determining a voiceprint recognition result by comparing the target feature information and registration feature information, the registration feature information obtained from a voice message of an object using the voiceprint recognition model.

10. The computer according to claim 9, wherein determining the voiceprint recognition result comprises:
calculating a cosine similarity according to the target feature information and the registration feature information;
determining that the target voice message is a voice message of the object in accordance with a determination that the cosine similarity reaches a first similarity threshold; and
determining that the target voice message is not a voice message of the object in accordance with a determination that the cosine similarity does not reach the first similarity threshold.

11. The computer according to claim 9, wherein determining the voiceprint recognition result comprises:
calculating a log-likelihood ratio between the target feature information and the registration feature information using a PLDA classifier;
determining that the target voice message is a voice message of the object in accordance with a determination that the log-likelihood ratio reaches a second similarity threshold; and
determining that the target voice message is not a voice message of the object in accordance with a determination that the log-likelihood ratio does not reach the second similarity threshold.

12. The computer according to claim 9, wherein training the CNN further comprises:
determining, for each of the voice messages, a deep feature corresponding to the voice message using the CNN;
obtaining a fully connected layer weight matrix according to the voice messages; and
determining the first loss function according to the deep feature of each of the voice messages and the fully connected layer weight matrix.

13. The computer according to claim 12, wherein determining the first loss function according to the deep feature of each of the voice messages and the fully connected layer weight matrix comprises:
determining the first loss function according to:

$$L_s = -\sum_{i=1}^{M} \log \frac{e^{W_{y_i}^T x_i + b_{y_i}}}{\sum_{j=1}^{N} e^{W_v^T x_i + b_j}},$$

wherein:
$L_s$ represents the first loss function, $x_i$ represents the i th deep feature from the $Y_i$ th object, $W_v$ represents the v th column in the fully connected layer weight matrix, $b_j$ represents a bias of the j th class, each class corresponding to an object, M represents a group size of a training set corresponding to the voice message set, and N represents a quantity of objects corresponding to the voice message set.

14. The computer according to claim 9, wherein training the CNN further comprises:
determining, for each of the voice messages, a deep feature corresponding to the voice message using the CNN;
calculating a deep feature gradient according to the deep feature of each of the voice messages;
calculating a second voice mean according to the deep feature gradient and a first voice mean; and
determining the second loss function according to the deep feature of each of the voice messages and the second voice mean.

15. The computer according to claim 14, wherein calculating the deep feature gradient according to the deep feature of each of the voice messages comprises:
calculating the deep feature gradient according to:

$$\Delta \mu_j = \frac{\sum_{i=1}^{M} \delta(y_i = j)(\mu_j - x_i)}{1 + \sum_{i=1}^{M} \delta(y_i = j)},$$

wherein $\Delta\mu_j$ represents the deep feature gradient, M represents the group size of the training set corresponding to the voice message set, j represents a class, each class corresponding to an object, and $y_i$ represents the $y_i$ th object;

calculating the second voice mean according to the deep feature gradient and the first voice mean comprises:

calculating the second voice mean according to:

$$\mu_j^{t+1} = \mu_j^t - \alpha\Delta\mu_j^t$$

, wherein t represents a moment, $\mu_j^{t+1}$ represents the second voice mean corresponding to a moment t+1, $\mu_j^t$ represents the first voice mean corresponding to a moment t, $\Delta\mu_j^t$ represents representing the deep feature gradient corresponding to the moment t, and $\alpha$ represent a learning rate parameter, a value range of $\alpha$ being greater than or equal to 0 and less than or equal to 1; and determining the second loss function according to the deep feature of each of the voice messages and the second voice mean comprises:

determining the second loss function according to:

$$L_c = \sum_{i=1}^{M} \|x_i - \mu_{yi}\|_2^2 L_c = \sum_{i=1}^{M} \|x_i - \mu_{yi}\|_2^2,$$

wherein $L_c$ represents the second loss function, $x^i$ represents the i th deep feature from the $y_i$ th object, and $\mu^{yi}$ represents a mean of a deep discrimination feature from the $y_i$ th object.

16. The computer according to claim 9, wherein the plurality of operations further comprise determining a model adjustment function according to the first loss function and the second loss function according to in the following manner:

$$L_t = L_s + \lambda L_c$$

, wherein $L_t$ represents the model adjustment function, $L_s$ represents the first loss function, $L_c$ represents the second loss function, and $\lambda$ represents a control parameter.

17. A non-transitory computer-readable storage medium, comprising a plurality of computer programs, the plurality of computer programs, when executed by one or more processors of a computer, cause the one or more processors to perform a plurality of operations including:

obtaining a target voice message;

obtaining text-independent target feature information of the target voice message by using a voiceprint recognition model, the voiceprint recognition model obtained through training according to a first loss function and a second loss function, the first loss function being a normalized exponential function that discriminates between deep features associated with different objects, and the second loss function being a centralization function that reduces variations in the deep features associated with the same object, and the voiceprint recognition model is obtained through training a convolutional neural network (CNN) by:

obtaining a voice message set comprising voice messages corresponding to multiple training objects;

capturing, from the voice messages, voice segments;

inputting the captured voice segments to the CNN to obtain a deep feature of a sentence level for each of the voice messages;

training the CNN as the voiceprint recognition model by joint supervision of the deep features of the voice messages corresponding to the training objects with the first loss function discriminating the deep features corresponding to different training objects in the voice messages and the second loss function reducing variations in the deep features of the same training object and determining a voiceprint recognition result by comparing the target feature information and registration feature information, the registration feature information obtained from a voice message of an object using the voiceprint recognition model.

* * * * *